United States Patent [19]

Nagata

[11] Patent Number: 5,297,718
[45] Date of Patent: Mar. 29, 1994

[54] SOLDERING METHOD AND SOLDERING APPARATUS

[76] Inventor: Eishu Nagata, 453-23, Wakabadai, Nagareyama-shi, Chiba 270-01, Japan

[21] Appl. No.: 73,664

[22] Filed: Jun. 8, 1993

[30] Foreign Application Priority Data

Jun. 8, 1992 [JP] Japan ................... 4-171490

[51] Int. Cl.⁵ .................... B23K 3/00; H05K 3/34
[52] U.S. Cl. ................... 228/102; 228/254;
 228/8; 228/33; 222/591; 118/300; 427/123
[58] Field of Search ............ 228/102, 105, 254, 8,
 228/33; 222/591; 118/300; 427/123, 383.7

[56] References Cited

U.S. PATENT DOCUMENTS

| | | | |
|---|---|---|---|
| 5,038,995 | 8/1991 | Nagata | 228/33 |
| 5,193,738 | 3/1993 | Hayes | 228/33 |
| 5,238,176 | 8/1993 | Nishimura | 228/33 |

FOREIGN PATENT DOCUMENTS

| | | | |
|---|---|---|---|
| 0168605 | 5/1985 | European Pat. Off. | |
| 0378369 | 1/1990 | European Pat. Off. | |
| 4634209 | 10/1971 | Japan | |
| 5077427 | 7/1975 | Japan | |
| 62-257750 | 11/1987 | Japan | 228/33 |
| 62-270272 | 11/1987 | Japan | 228/33 |
| 63-309370 | 12/1988 | Japan | |

*Primary Examiner*—Samuel M. Heinrich
*Attorney, Agent, or Firm*—Sughrue, Mion, Zinn, Macpeak & Seas

[57] ABSTRACT

The improvement in the soldering method of soldering a workpiece comprising the steps of forming a solder melting pot by engaging plural trowel members, supplying a solder tip having a constant volume to the solder melting pot, melting the solder tip and holding the molten solder temporarily in the solder melting pot and then separating the plural trowel members to allow the molten solder to drop onto the workpiece. The improvement comprises detecting complete melting of the solder tip by sensing the change in intensity of the light reflected by the surface of the molten solder, and heating the molten solder for an additional time period after the completion of melting of the solder tip. A soldering apparatus for use to realize the aforementioned method is also provided.

14 Claims, 12 Drawing Sheets

SOLDERING METHOD AND SOLDERING APPARATUS

BACKGROUND OF THE INVENTION

1. Field of the Invention

The present invention relates to a soldering method and soldering apparatus for dropping molten or semi-molten solder (hereinafter referred to simply as molten solder) on a workpiece to effect soldering.

2. Prior Art Statement

Japanese Patent Publication No. 34209/1971 discloses a soldering apparatus for applying molten solder onto a desired point or area of a workpiece, such as a printed circuit board, wherein a conical pot is used for melting a solid solder. A rod-shaped solder is cut and fed to the conical pot to be melted therein and the molten solder is allowed to drop through a hole provided at the bottom of the pot. However, this type soldering apparatus has a problem that some portion of the solid solder drops through the hole in the unmelted state while the other portion of the solder is dropped in the overheated condition, since it is impossible to retain the whole solid solder for a constant time, resulting in uneven and unreliable soldering.

Unexamined Japanese Utility Model Publication No. 77427/1975 discloses a soldering apparatus having a conical melting pot provided with a needle valve at the bottom of the pot. In this known apparatus, a molten mass of solder is contained in the conical melting pot, and a constant volume of the molten solder is allowed to drop through the needle valve. However, due to surface tension of the molten solder, it becomes impossible to control the volume of dropping molten solder precisely particularly when the volume of molten solder to be applied onto the workpice is relatively small, as is the case where the workpice is a printed circuit board.

In order to solve the aforementioned problems of the known apparatuses, the inventor of this invention has previously proposed an improvement in soldering in my earlier Japanese Patent Application No. 110505/1986 which is published as JP-A-62-270272. According to my previous proposal, a solder melting pot is formed by plural trowel members which engage with each other to hold a solid solder tip or piece for a pre-set time to melt the same and then they are separated to allow the molten solder to drop onto a desired point or area of a workpiece.

However, in the method according to my prior proposal, the time for falling the solid solder tip from the solder cutter to the solder melting pot cannot be controlled so that it becomes hard to control the temperature of the molten solder in the solder melting pot to a constant temperature.

To solve the aforementioned problem, the inventor of this application has proposed another method in which a solder tip cut from a rod-shaped solder to have a constant length (i.e. constant volume) is tentatively received in a cradle to hold the same in the stationary condition, and then the cradle is inverted to allow the solder tip to drop through a tubular solder tip guide into a solder melting pot (Unexamined Japanese Patent Publication No. 2-182373, which corresponds to U.S. Pat. No. 5,038,995 and EP-0378369B).

However, even in the method according to my later proposal, there is a problem that the time costed for dropping the solder tip cannot be controlled to a constant time since the solder tip dropping from the cradle often contacts with the interior wall of the solder tip guide to change the dropping condition. Since the timing from which the solder tip begans to drop is detected and it is estimated that the solder tip is melted in the solder melting pot after the lapse of a constant time duration from that timing, the heating time for melting the solder tip is differentiated from the thus estimated time when the time costed for dropping the solder tip from the cradle to the solder melting pot is changed. This leads to temperature fluctuation of the molten solder from the optimum temperature so that false soldering, such as knotty or tubercled soldering, is resulted when the temperature of molten solder is lower than the optimum temperature or the molten solder is deteriorated in quantity when the temperature thereof is higher than the optimum temperature.

OBJECTS AND SUMMARY OF THE INVENTION

Accordingly, a first object of this invention is to provide a soldering method in which a small volume of molten solder maintained at the optimum temperature is allowed to drop onto a workpice to effect even soldering in a reliable condition.

A second object of this invention is to provide a soldering apparatus used for realization of such a soldering method.

According to the present invention, the first object is attained by the provision of an improvement in the soldering method the steps of forming a solder melting pot by engaging plural trowel members, each of said trowel members having a surface made of a solder repellent material at least the portion contacting with the solder, supplying a solder tip having a constant volume to said solder melting pot, melting said solder tip and holding the molten solder temporarily in said solder melting pot and then separating said plural trowel members to allow the molten solder to drop onto said workpiece, an improved method wherein melting of said solder tip is detected by sensing the change in intensity of the light reflected by the surface of said molten solder, and wherein said molten solder is additionally heated for a predetermined time period after the completion of melting of said solder tip.

The solder in the solder melting pot formed by the trowel members may be monitored from the overhead position to detect melting of the solder. Alternatively, melting of the solder may be detected by sensing the presence of the bulged portion of molten solder dropped from the solder melting pot to the vicinity of the lower end of the trowel members.

The second object of the invention is attained by the provision of a soldering apparatus comprising:

plural trowel members each having a surface made of a solder repellent material at least the portion contacting with the solder, said plural trowel members being engaged together to form a solder melting pot and separated from each other to allow the molten solder to drop onto a workpiece, said solder tip being melted in said solder melting pot and then allowed to drop when said plural trowel members are separated from each other;

a light emitting element for emitting light toward the surface of the molten solder held in said solder melting pot;

a light receiving element for receiving the light reflected by the surface of molten solder; and a controller for detecting the change in intensity of reflected light to subject the molten solder to additional heating for a predetermined time period from the time at which the change in intensity of reflected light is detected.

BRIEF DESCRIPTION OF THE DRAWINGS

The above and other objects and advantages of the invention becomes apparent from the following description of presently preferred embodiments illustrated, by way of example only, in the appended drawings in which.

EMBODIMENTS OF THE INVENTION

Presently preferred embodiments of the present invention will now be described in detail with reference of the appended drawings.

Figure 1:
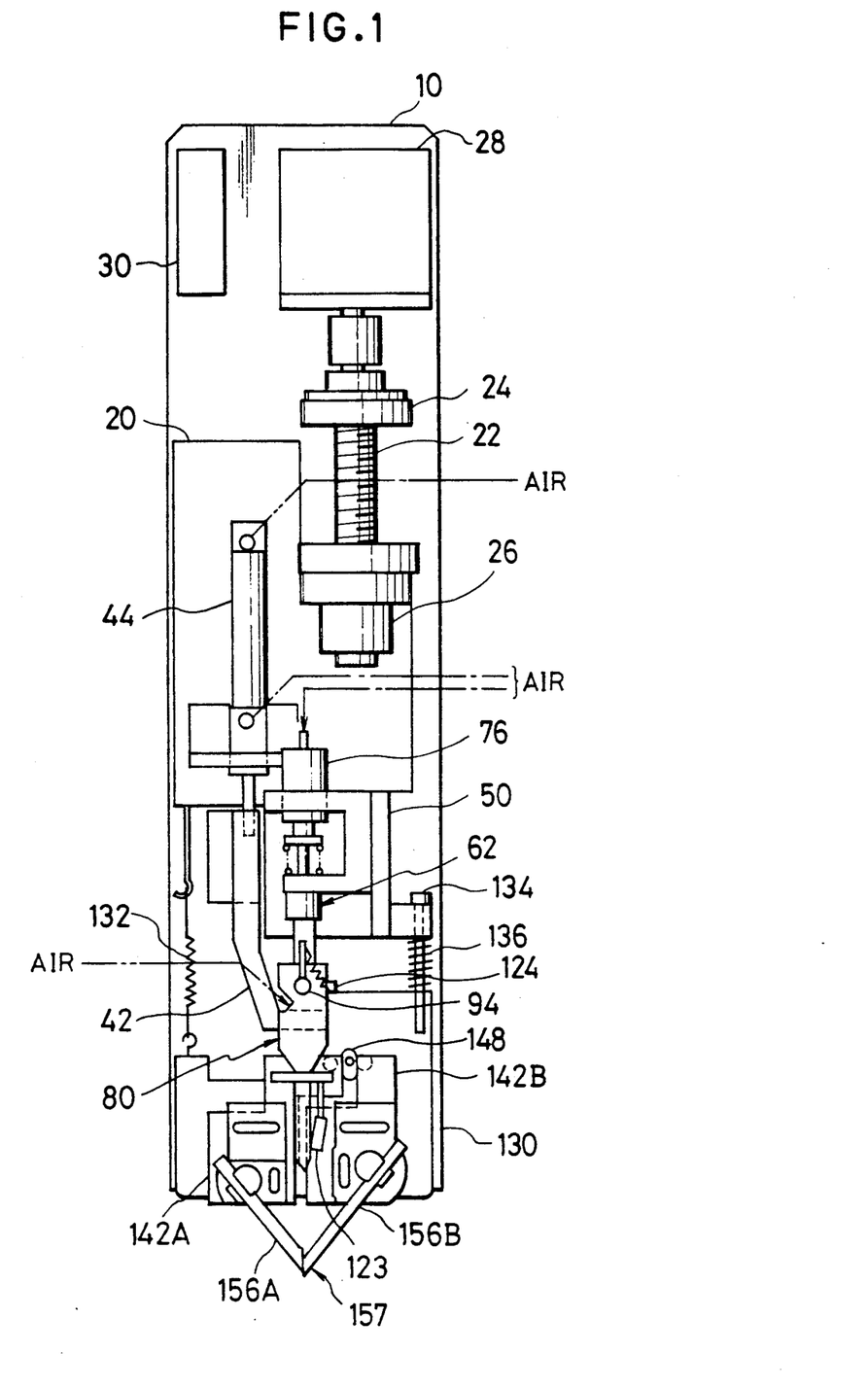
FIG. 1 is a front end view of an embodiment of the soldering apparatus according to the invention.
Figure 2:
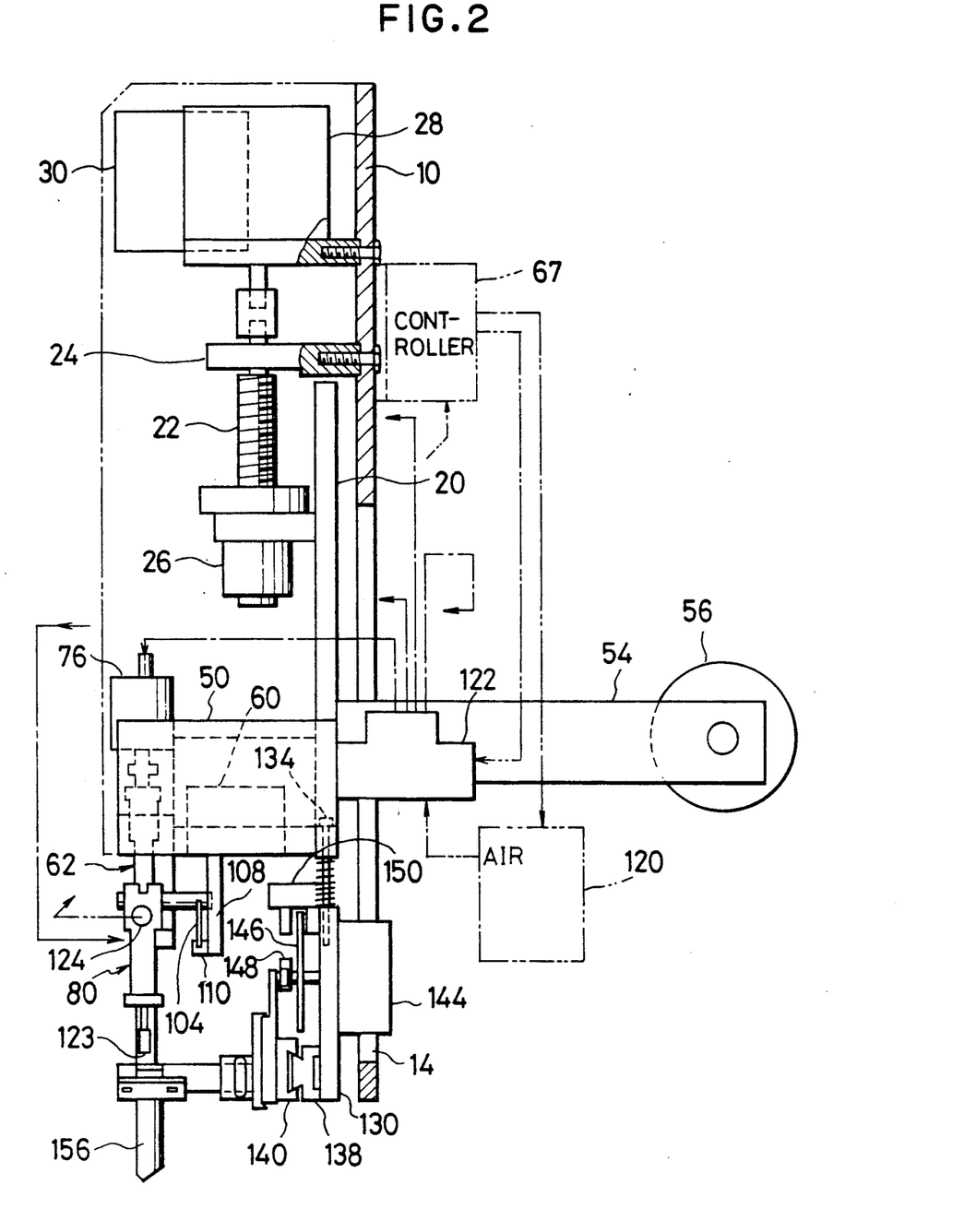
FIG. 2 shows a side elevation of the embodiment shown in FIG. 1.
Figure 3:
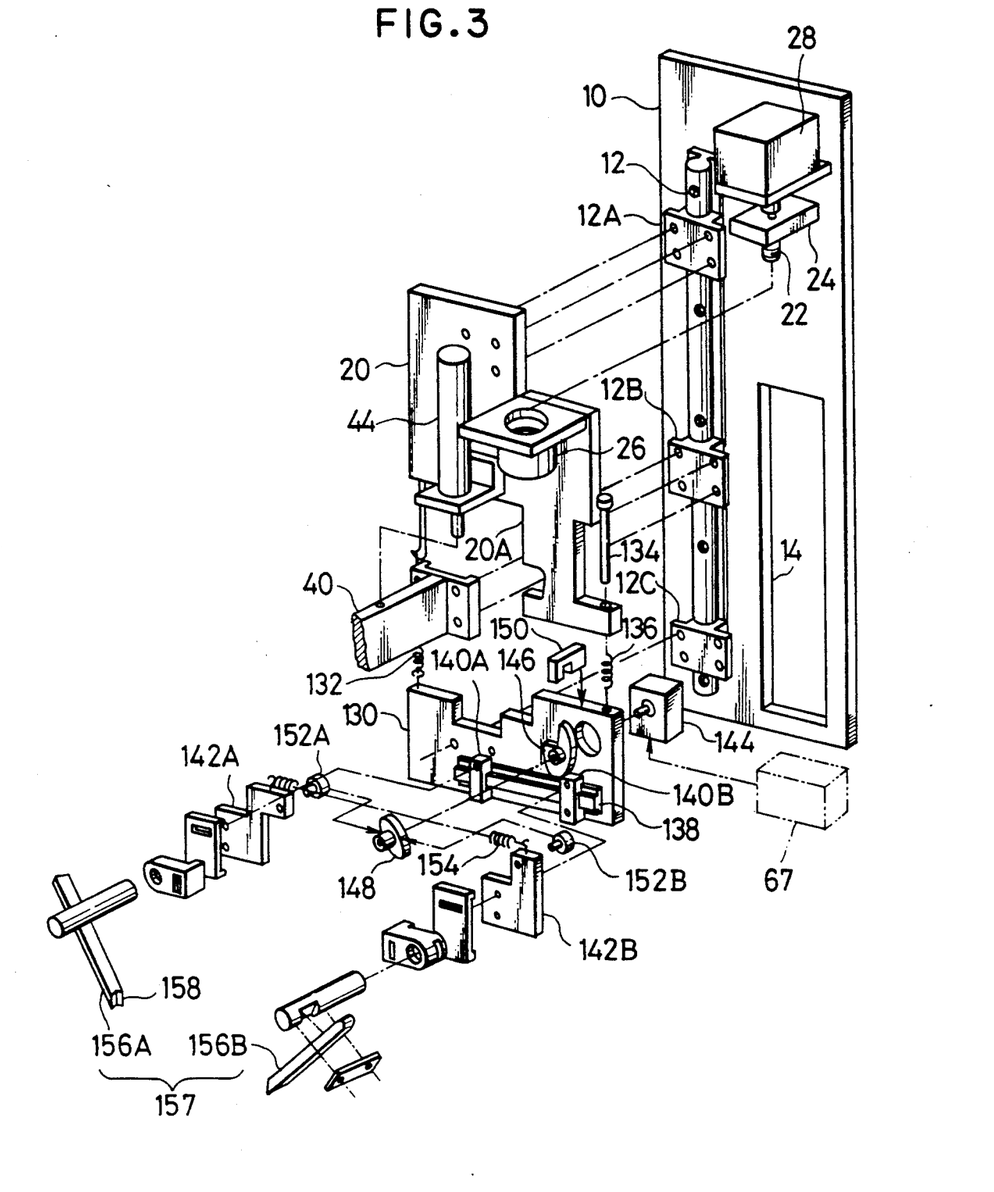
FIG. 3 is an exploded view showing parts of the embodiment shown in FIG. 1.
Figure 4:
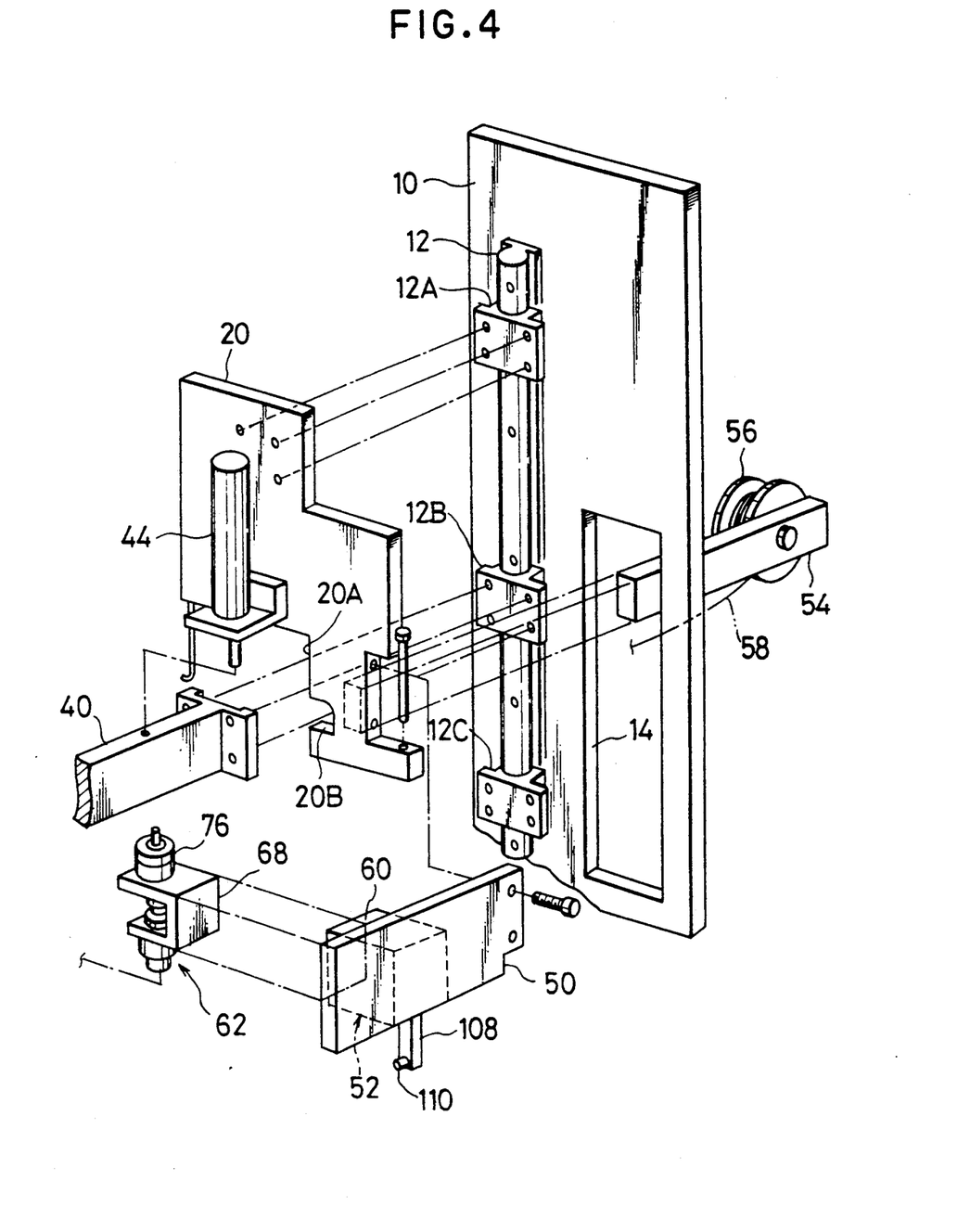
FIG. 4 is a further exploded view showing parts of the embodiment shown in FIG. 1.
Figure 5:
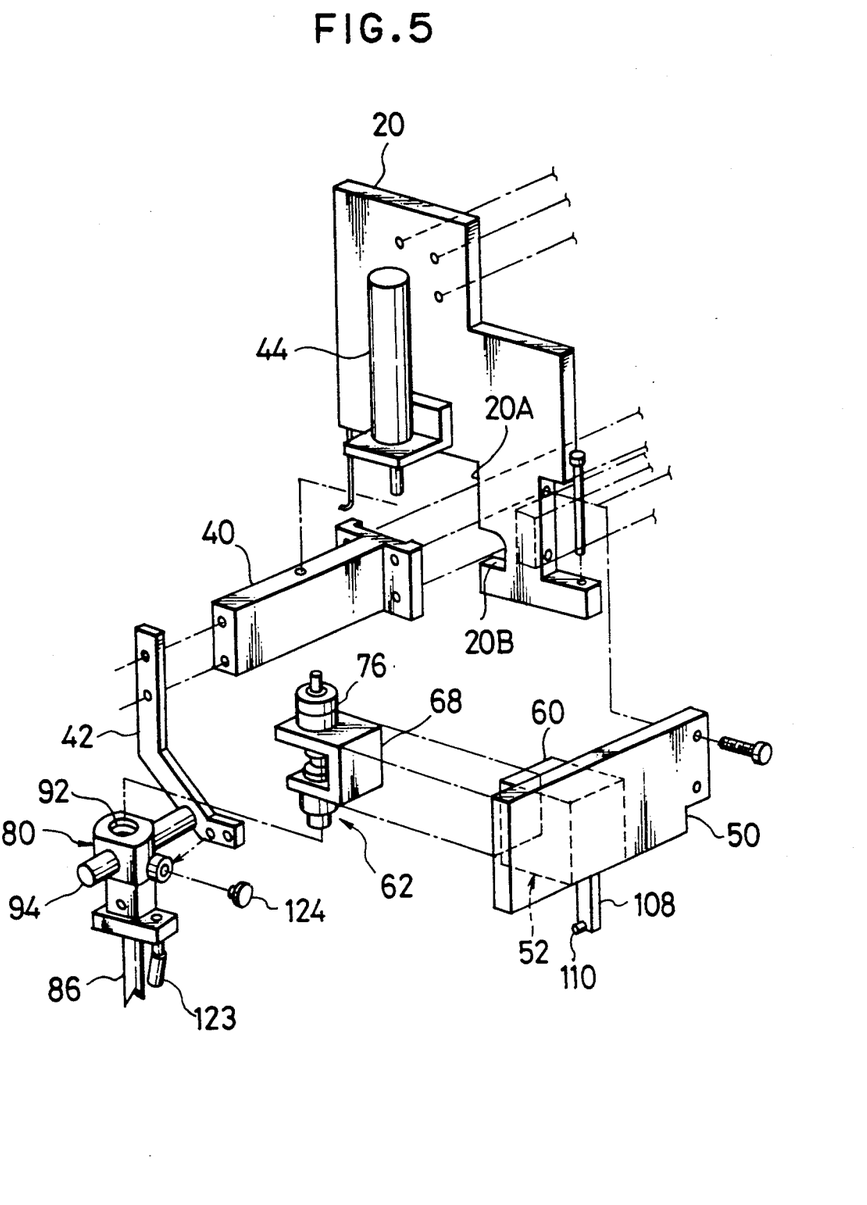
FIG. 5 is a further exploded view showing parts of the embodiment shown in FIG. 1.

Initially referring to FIGS. 1 to 5, an elongated carrier plate 10 is denoted by reference numeral 10 and fixed to a not-shown stand to extend in the vertical direction. As shown in FIGS. 3 and 4, a linear bearing track 12 is fixed on one side of the carrier plate 10 to extend vertically, and three movable blocks 12A, 12B and 12C are movably mounted on the track 12. Each of the movable blocks 12A to 12C contains a bearing and is moved smoothly along the track 12 in the vertical direction without rotating around the track 12. An elongated window or opening 14 is formed through the carrier plate 10 at the right side as viewed is FIGS. 3 and 4.

A movable plate 20 is fixed to the uppermost movable block 12A to be moved in the vertical direction. A feed screw 22 extends in the vertical direction and has an upper end fixedly held by a bearing holder 24 which is fixed at an upper right portion of the carrier plate 10, the feed screw being thrusted into a nut holder 26 fixed to the movable plate 20. The feed screw 22 is rotated by a stepping motor 28 secured to an upper portion of the carrier plate 10. As the feed screw 22 rotates, the movable plate 20 which is integrally fixed to the nut holder 26 is moved in the vertical direction.

A fan motor 30 is provided at the left side (as viewed in FIGS. 1 and 2) of the motor 28. The top, front, left and right sides of the assembled soldering apparatus are covered by a cover plate (not shown), and the carrier plate 10 serves as a backing plate. Fresh air is introduced by the fan motor 30 into the space covered by the cover plate, and the thus introduced air is flown downwards to remove smokes generating from the solder as it is melted.

A solder guide bracket is denoted by reference numeral 40. The bracket 40 is fixed to the intermediate movable block 12B mounted on the linear bearing track 12 and extends forwardly through a cut-out 20A formed through the upper movable plate 20. An arm 42 is fixed to the fore end of the bracket 40 and has a lower end extending to a vicinity of the front center portion of the soldering apparatus. A solder guide assembly 80 serving as a solder tip guide means, which will be described in detail hereinafter, is fixed to the lower end of the arm 42.

The bracket 40 is moved in the vertical direction by means of an air cylinder 44 which is fixed to the upper movable plate 20. In detail, the cylinder of the air cylinder 44 is fixed to the upper movable plate 20, and a piston rod operatively associated with the air cylinder 44 has an lower end secured to the top face of the bracket 40.

Reference numeral 50 designates a solder feeder plate fixed on the upper movable plate 20. As shown in FIG. 4, the plate 50 is fixedly secured on the right end face of the upper movable plate 20 to extend forwardly. A solder tip supply assembly 52 is mounted on the plate 50, and the solder tip supply assembly 52 supplies a solder tip 58A cut to have a constant length to the solder guide assembly 80 which will be described in detail hereinafter.

Referring to FIGS. 2 and 4, a reel holding arm is denoted by 54 and has one end fixed to the back side of the upper movable plate 20 and the other end extending rearwards through the window 14 of the carrier plate 10. A solder reel 56 is held by the reel holding arm 54, and a continuous rod-shaped or wire solder 58 is fed from the reel 56 to pass through a window 20B (see FIG. 4) formed aside the cut-out 20A of the upper movable plate 20 into the solder tip supply assembly 52.

Figure 6:
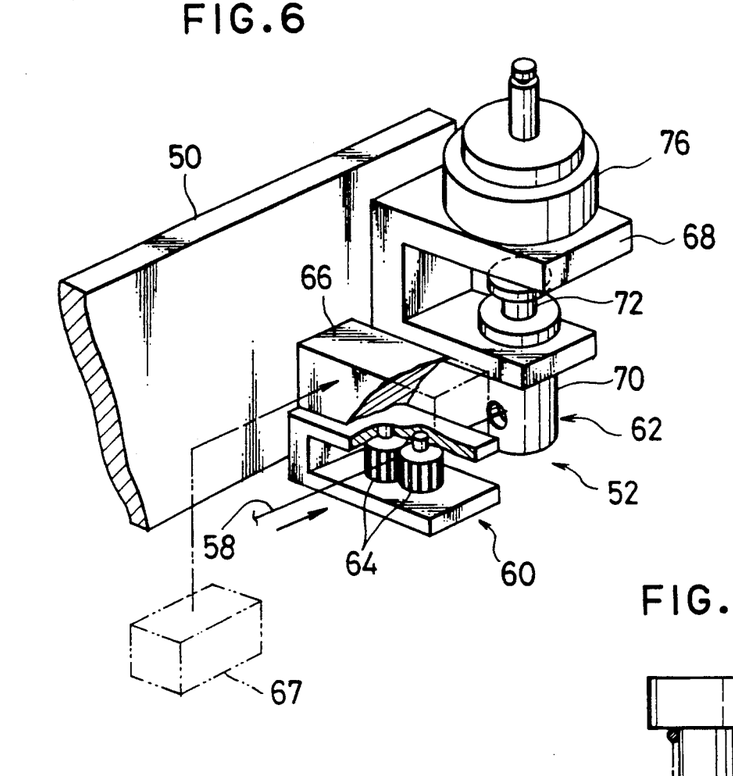
FIG. 6 is a perspective view showing the solder supply assembly.

The solder tip supply assembly 52 comprises a feed section 60 and a cutter section 62, as shown in FIG. 6. The feed section 60 includes paired roller 64, 64 for grasping the solder 58, and a stepping motor 66 which drives one of the rollers 64. The motor 66 is controlled by a controller 67 shown in FIG. 2 to rotate the roller 64 at a pre-set timing to feed a predetermined length of the solder 58 to the cutter section 62.

Figure 7:
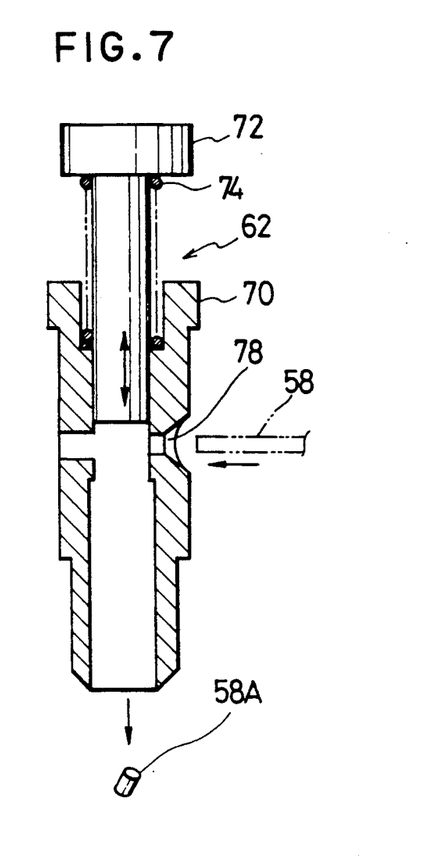
FIG. 7 is a sectional view showing the cutter for cutting a solder tip from a wire or rod of a solder.

The cutter section includes a holder 68 secured to the feeder plate 50 and having a shape of lying squalish letter U, a cylindrical body 70 secured to the bottom face of the lower leg of the holder 68, a cutter pin 72 movably inserted into the body 70, a restoration spring 74 (see FIG. 7) for restoring the cutter pin 72 to the upper position, and an air cylinder 76 mounted on the upper leg of the holder 68 to press the cutter pin 72 downwardly. A solder inlet port 78 is provided through the side wall of the body 70 and faces to the paired rollers 64, 64.

As a pre-set length of the rod-shaped solder 58 is fed by the feed section 60, the fore end of the solder 58 is moved through the solder inlet port 78 into the bore of the body 70, and then air is fed into the air cylinder 76 by changing over a change-over valve 122 in response to the instruction from the controller 67 so that the cutter pin 72 is pressed downwards. Whereupon, the fore end of the solder 58 is cut, and the cut solder tip 58A falls downwards through the bore of the body 70.

Figures 8, 9:
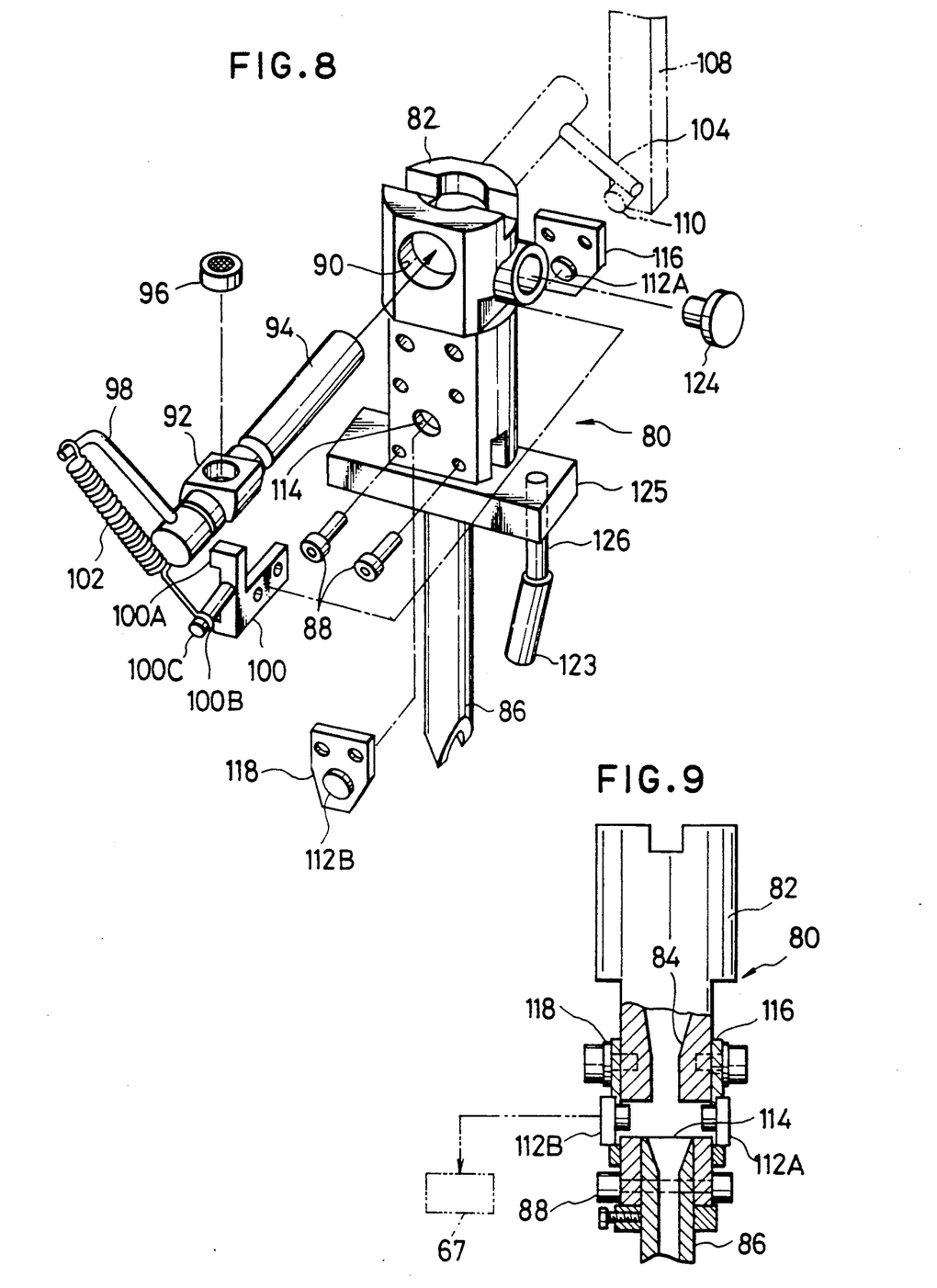
FIG. 8 is an exploded view showing the details of the solder guide assembly.
FIG. 9 is a sectional view taken along the center line of the solder guide assembly.
Figure 10A:
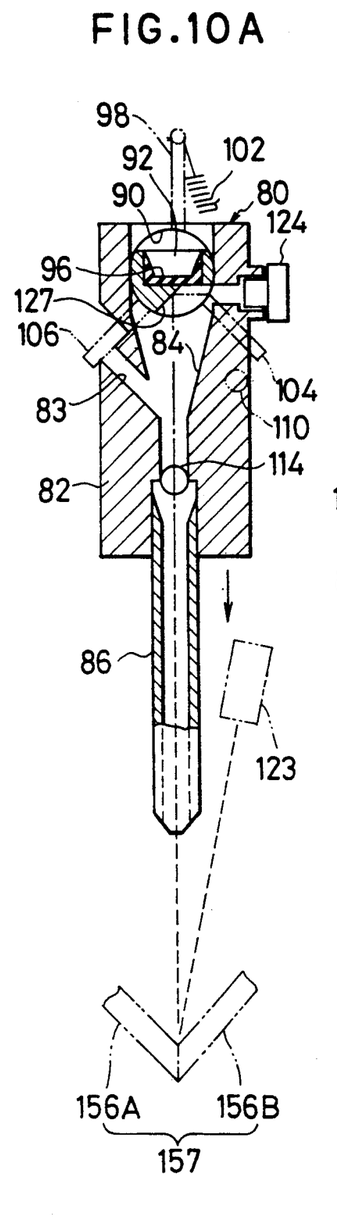
FIGS. 10A to 10C are views illustrating the operation of the cradle.
Figure 10B:
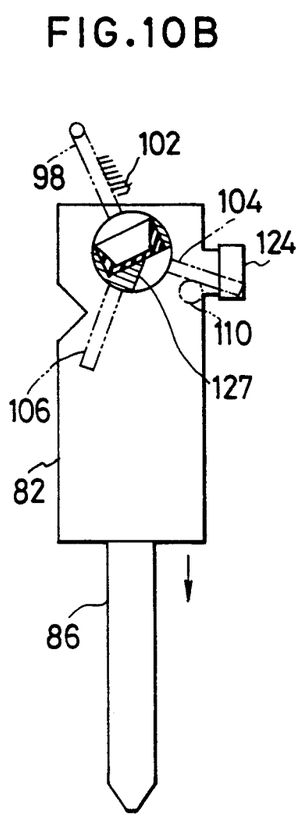
Figure 10C:
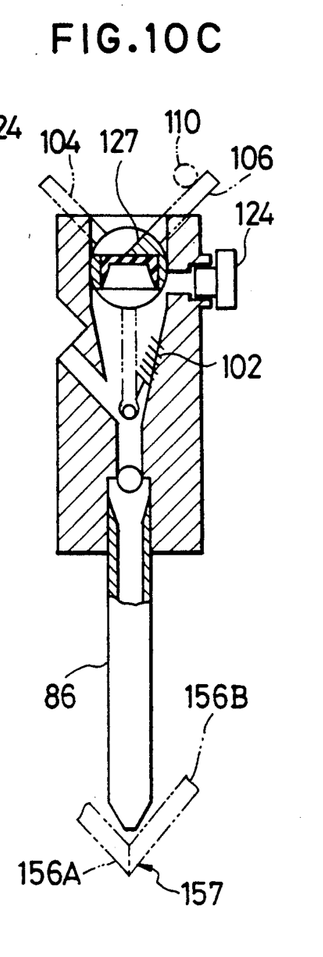

As shown in FIGS. 8 to 10, the solder guide assembly 80 has a body 82 through which a guide bore 84 is formed. The guide bore 84 extends in the vertical direction and has a funnel-shaped upper portion and a lower portion connected to a sleeve 86. In detail, a slot is formed transversely through the lower portion of the body 82, and the sleeve 86 inserted in the lower portion of the body 82 is fixed by fastening screws 88 (see FIGS. 8 and 9).

A transverse through-hole 90 extends through the wall of the body 82 at the position where the upper enlarged portion (i.e. the funnel-shaped upper portion) of the guide bore 84 is formed. A cradle 92 is contained in the enlarged portion of the guide bore 84, and a shaft 94 integrally fixed to the cradle 92 extends through the transverse through-hole 90. The cradle 92 serves as a receiver for receiving the solder tip 58A falling from the cutter section 62 and has the inner surface fitted with a cup 96 made of a fluorocarbon resin, such as Teflon (Trade Name) for preventing the solder tip 58 to stick onto the inner surface of the cradle 92. The inner surface of the cup 96 may be embossed with fine embosses or fine indents to facilitate smoother delivery of the solder tip 58A. Otherwise, the inner surface of the cradle 92 may be lined with a fluorocarbon resin.

The shaft 94 has a fore end to which an arm 98 is connected. A stopper 100 is connected to the body 82 so that the arm 98 swings as the shaft 94 is rotated by about 180 degrees between upper and lower opposing walls 100A and 100B of the stopper 100. When the arm 98 engages with the upper wall 100A of the stopper 100, the cradle 92 is held at the upside position where the opening of the cradle 92 faces upwards as shown in FIG. 10A. When the arm 98 engages with the lower wall 100B of the stopper 100, the cradle 92 is inverted to be held at the upside-down position where the opening of the cradle 92 faces downwards as shown in FIG. 10C. A coil spring 102 extends between the bent end of the arm 98 and a pin 100C fixed to the stopper 100 to retain the cradle 92 stably at the upside position shown in FIG. 10A and also at the upside-down position shown in FIG. 10C.

Two pins 104 and 106 are mounted to the rear end of the shaft 94 and extend radially from the shaft 94, the angle between the pin 104 and the pin 106 being about 90 degrees. These pins 104 and 106 extend obliquely as shown in FIG. 10A when the cradle 92 is retained in the upside position. On the other hand, an arm 108 (see FIGS. 2, 4, 5 and 8) is connected to the feeder plate 50 which is integrally mounted to the upper movable plate 20, the arm 108 extending downwardly and having the lower end from which a cam follower 110 protrudes to be engaged with the pins 104 and 106. With such a construction, as the solder guide assembly 80 is moved in the vertical direction by means of the air cylinder 44, these pins 104 and 106 engage with the cam follower 110 so that the cradle 92 is inverted between the upside position shown in FIG. 10A and the upside-down position shown in FIG. 10C. Namely, as the solder guide assembly 80 is lowered, the cradle 92 is inverted to be retained in the upside-down position.

A sensor 112 for sensing the falling solder tip 58A is disposed in the body 82 of the solder guide assembly 80 (see FIGS. 8 and 9). In detail, a transverse hole 114 is formed through the body 82 and crosses the solder guide bore 84 at right angle, and a light emitting element 112A is disposed at one end of the hole 114 and fixedly retained by a sensor carrying plate 116 while a light receiving element 112B is disposed at the other end of the hole 114 and fixedly retained by another sensor carrying plate 118. As the light receiving element 112B senses passage of the solder tip 58A, the controller 67 actuates clock means contained therein which counts the time from the timing at which the solder tip 58A is sensed. The time period for retaining and melting the solder tip 58A within the solder melting pot 157 formed by the trowel members 156, the details of which will be described hereinafter, is controlled by the controller 67 with reference to the lapse of time counted by the clock means.

The body 82 of the solder guide assembly 80 is also provided with an air inlet port 83 (see FIG. 10A) through which air is blown into the guide bore 84. The air blown through the inlet port 83 prevents the smoke generated from the molten solder in the trowel members 156 from sticking to the inner surface of the guide bore 84 to ensure smooth fall-down of the solder tip 58A.

Air fed to the body 82 and the air cylinders 44 and 76 is supplied from an external air pump 120, as shown in FIG. 2, and intermittently supplied by means of a change-over valve 122.

The solder guide assembly 80 is provided with a light emitting element 123 and a light receiving element 124. In detail, a horizontal plate 125 is fixed to the body 82, and a rod 126 extends downwardly from the plate 125 and has a lower end to which the light emitting element 123 is secured (FIG. 8). The light emitting element 123 may be LED, semiconductor laser or another type light emitting element and emits a light beam toward a portion of the molten solder contained in the melting pot 157 formed by two opposing trowels 156 (156A, 156B).

The light receiving element 124 may be, for example, a photo transistor and is secured on the side wall of the body 82. On the other hand, a reflector mirror 127 is formed on the bottom of the cradle 92. As shown in FIG. 10A, the mirror 127 has a reflecting surface which extends at an angle of 45 degrees relative to the horizontal plane when the cradle 92 is in the upside condition. As the solder is melted in the solder melting pot 157 formed by the trowel members 156, the light beam from the light emitting element 123 is reflected by the surface of the molten solder mass and a portion of the reflected light beam passes through a sleeve 86 and the guide bore 84. The mirror 127 reflects the light beam passing through the sleeve 86 to the light receiving element 124.

The details of the trowel members 156 which come together to form the solder melting pot 157 will now be described. In FIG. 3, reference numeral 130 designates a lower movable plate. The lower movable plate 130 is secured to the movable block 12C to be moved in the vertical direction. The left side of the lower or first movable plate 130 is suspended from the upper or second movable plate 20 through a coil spring 132, and the right side thereof is suspended from the upper movable plate 20 through a long bolt 134. As a result, the lower movable plate 130 is moved in the vertical direction together with the upper movable plate 20.

The bolt 134 is slidingly inserted through a bore formed in the upper movable plate 20 so that the lower movable plate 130 is moved upwards together with the trowel members 156 when the trowel members 156 impinge on the surface of the workpiece to prevent damage of the workpiece upon such impingement by the trowel members 156. A compression spring 136 is disposed around the bolt 134 to apply a proper compression force on the trowel members 156 when it is desired to press the trowel members 156 onto the surface of the workpiece.

A slide rail 138 is secured to the lower movable plate 130 and extends horizontally. Movable blocks 140A and 140B are slidingly mounted to the rail 138, and paired trowel member carrier plates 142 (142A, 142B) are fixed to the movable blocks 140A and 140B. A stepping motor 144 is mounted on the back side of the lower movable plate 130 and has a shaft extending forwards through the lower movable plate 130. An encoder cam 146 and a cam 148 are fixedly mounted on the fore end of the shaft of the motor 144.

The encorder cam 146 detects the rotation angle of the motor 144 by a photo-sensor 150. The cam 148 has a generally elliptical contour and symmetrically mounted on the shaft of the motor 144. Cam followers 152 (152A, 152B) mounted to the aforementioned trowel member carrier plates 142 rotatably engage with the cam 148 from the right and left sides. The trowel member carrier plates 142 are biased by a spring 154 to be applied with a force which acts to allow the carrier plates 142 to come close with each other (see FIG. 3).

In the illustrated embodiment, paired trowel members (or soldering iron members) 156 (156A, 156B) are secured to the trowel member carrier plates 142, the angle and position of each trowel member 156 being adjustable. These trowel members 156 extend obliquely from the carrier plates 142 to have their lower ends separably engaged with each other just beneath the sleeve 86 connected to the aforementioned solder tip guide assembly 80. When these trowel members 156A, 156B come close with each other, they form the solder melting pot 157 having a V-shaped section when viewed from the front side. Each trowel member 156 contains a nichrom wire heater and has a surface made of a material which repels molten solder, such as ceramics, fluorocarbon resin or stainless steel. A silicon nitride ceramic material is particularly preferred, since it is highly resistive to permeation of solder and to chemicals, such as hydrochloric acid, contained in the flux of the solder and also has improved durability.

Grooves 158 are formed on the opposing surfaces of these trowel members 156 (only one groove being shown in FIG. 3) so that a cavity defining the solder melting pot 157 is formed by these grooves 158 when these trowel members 156 come close with each other.

The operation of the illustrated embodiment will now be described. FIGS. 11A to 11F shows an exemplified operation sequence for soldering a lead wire 162 of an electric part 160, such as a resistor, on a printed circuit board 164 from the upside surface of the printed circuit board 164, the end of the lead wire 162 being inserted through a through-hole of the board 164.

Figure 11A:
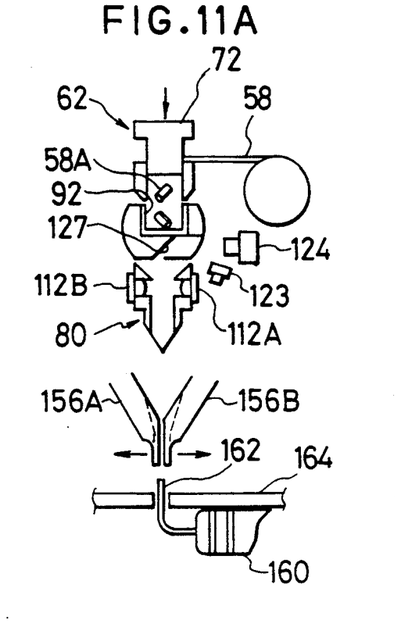
FIGS. 11A to 11F are views showing an exemplified operation of the soldering apparatus of the invention.

Initially, a desired portion of a workpiece, on which molten solder is applied, is placed beneath the assembled trowel members 156. The solder tip guide assembly 80 is positioned at the upper position as shown in FIGS. 1, 2 and 11A, and the trowel members 156 are closely retained with their end faces engaging with wach other.

A pre-set length of the rod-shaped solder 58 is supplied by the solder tip supply assembly 52, and then the cutter pin 72 is lowered by the air cylinder 76 to cut a solder tip having a predetermined length. The thus cut solder tip 58A is allowed to fall down into the cradle 92. Solder supply and cutting operations are repeated until a desired number of solder tip 58A is contained in the cradle 92 of the solder tip guide assembly 80.

Figure 12:
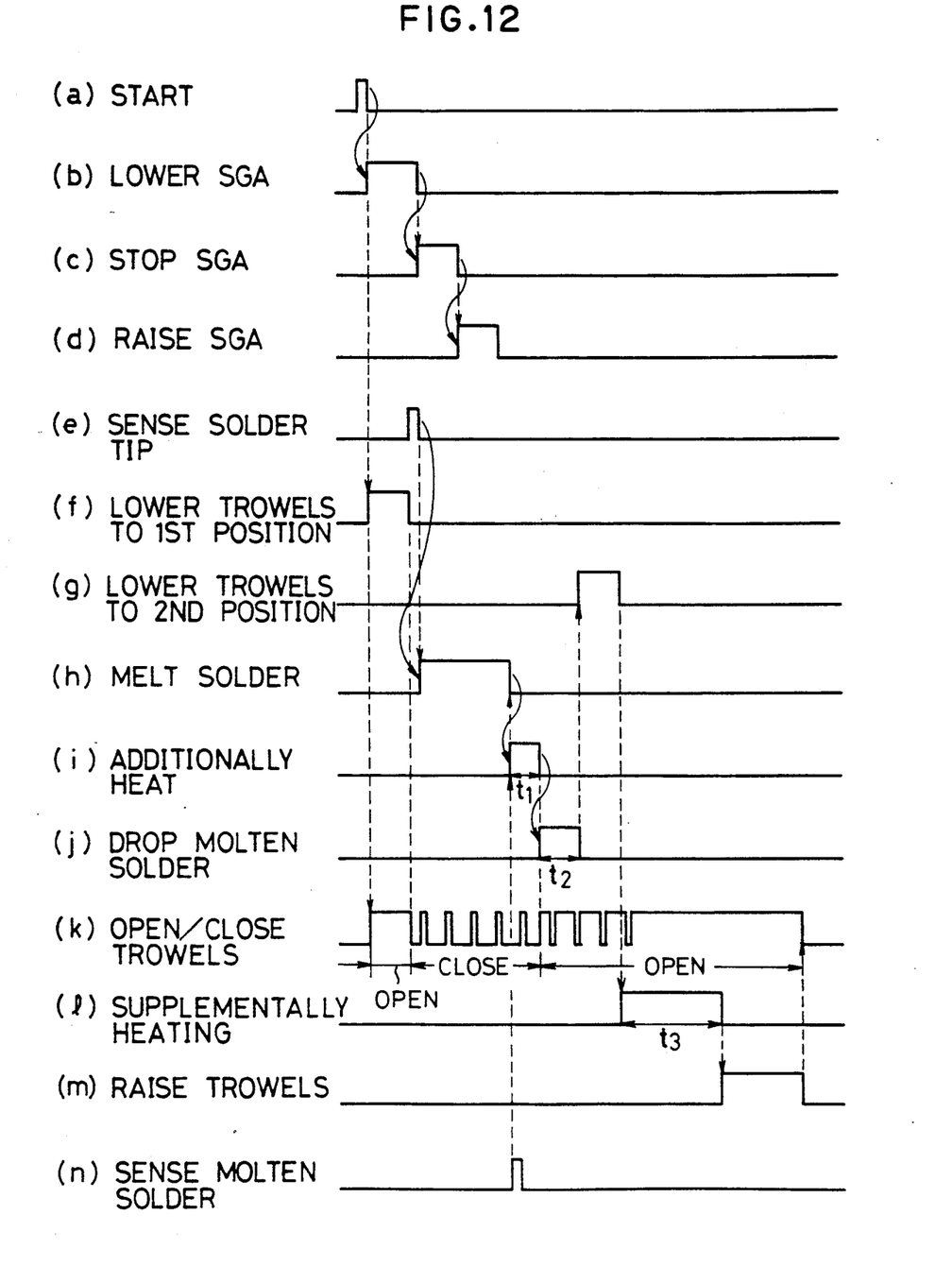
FIG. 12 is a timing chart showing the operation sequence of the apparatus of the invention.

When a start signal is fed (timing (a) in FIG. 12), air is supplied into the air cylinder 44 to lower the bracket 40 together with the solder tip guide assembly 80 and the trowel members 156 (the solder tip guide assembly 80 being moved to a lower position and concurrently the trowel members 156 being lowered to a first lowered position). The trowel members 156 are held in the position at which the opposing ends thereof are separated by a small gap, and the pin 104 of the shaft 94 engages with the cam follower 110 to rotate the shaft 94 as shown in FIG. 10B as the solder tip guide assembly 80 is lowered (timing (b) in FIG. 12; abridged notation SGA in FIG. 12 means the solder guide assembly.).

When the spring 102 connected to the fore end of the stopper 100 moves beyond the unstable point at which the spring 102 passes the center axis of the shaft 94, the shaft 94 is rotated promptly to the position shown in FIG. 10C by the action of the spring 102. The cradle 92 is thus inverted, and the solder tips 58A leave from the cradle 92 while being applied with a shock of prompt inversion of the cradle 92 to fall through the guide bore 84 in the solder tip guide assembly 80 and then through the sleeve 86 (see FIG. 11B).

Figure 11B:
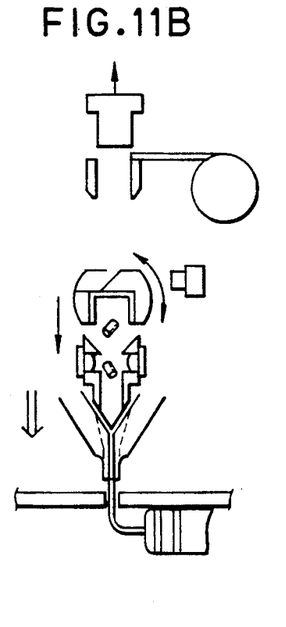

As the solder tip guide assembly 80 is moved to the lower position, the lower end of the sleeve 86 comes close to the solder melting pot 157 formed by the assembled trowel members 156 (as best seen in FIGS. 10C and 11B). The solder tips 58A fall through the sleeve 86 to be received in the solder melting pot formed by the assembled trowel members 156. As the solder guide assembly 80 is lowered, the end of the lead wire 162 is inserted in-between the gap formed by the opposing ends of the trowel members 156. This position will be referred to as the first lowered position (timing (f) in FIG. 12).

Figure 11C:
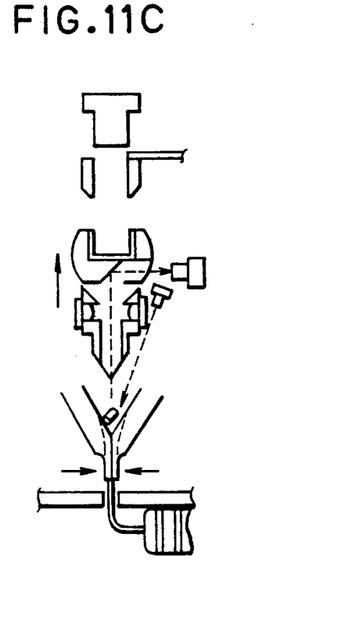
Figure 11D:
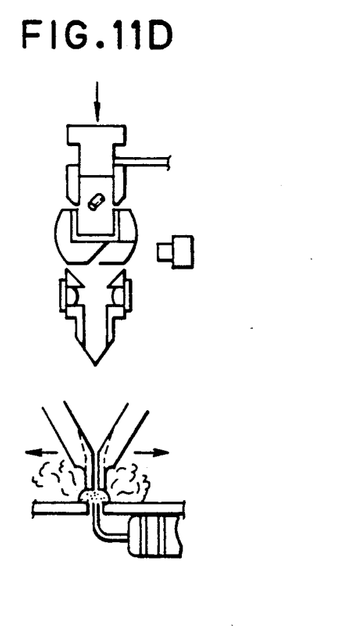
Figure 11E:
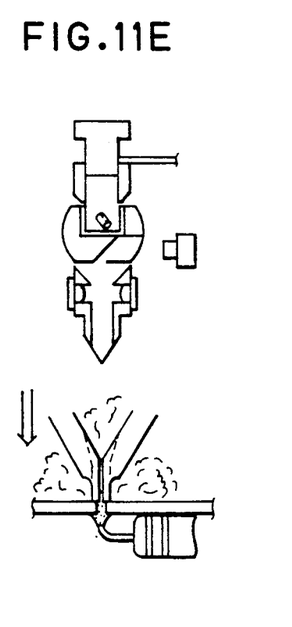
Figure 11F:
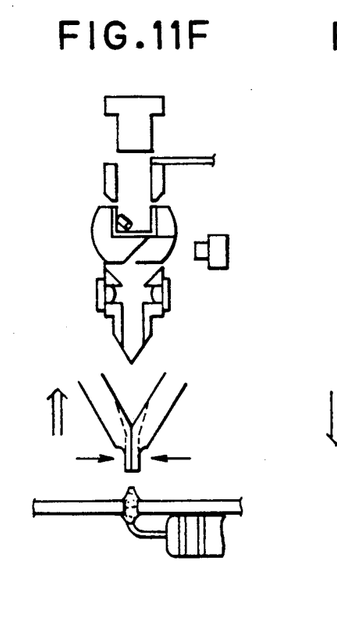

The solder guide assembly 80 is returned back to the raised stand-by position shown in FIG. 10A and 11C at the timing (d) in FIG. 12. The trowel members 156 come closer with each other to grasp the end of the lead wire 162 by the ends thereof and the end of the lead wire 162 is heated during the time when the solder guide assembly 156 is raised. The trowel members 156 are opened and then closed repeatedly to ensure smooth contact between the solder tips 58A and the surface of the solder melting pot 157 and to realize uniform melting of the solder. The timing of this operation is shown by the timing (k) in FIG. 12.

After the lapse of time shown by the timing (c) in FIG. 12, the solder guide assembly 80 is returned back to the raised position at the timing (d) in FIG. 12. As a result, the cradle 92 is in the position as shown in FIG. 11C, and a light beam is emitted from the light emitting element 123 toward the solder melting pot 157. As the solder tips 58A are melted in the solder melting pot 157, the solder is liquefied to form a bead-shaped molten solder mass having a surface which reflects the light beam. The reflectivity of the molten solder is higher than that of the unmelted solid solder tip, so that the intensity of the reflected light beam is abruptly increased. A portion of the reflected light beam passes through the sleeve 86 and reflected by the mirror 127 provided on the outer surface of the bottom of the cradle 92 to be received by the light receiving element 124 (see FIG. 11C).

On the other hand, the light receiving element 112B of the solder sensor senses the solder tips 58A falling through the guide bore 84 to generate signals (at the timing (e) of FIG. 12). The signals generated from the light receiving element 112B are fed to the controller 67 which instructs the melt timer (1) to begin counting of the lapse of time (timing (h) in FIG. 12). When melting of the solder is detected by the light receiving element 112B of the sensor for sensing melting of the solder, the controller 67 instructs the melt timer (1) to stop counting and instructs the melt timer (2) to begin counting of the lapse of time (timings (h), (n) and (i) in FIG. 12).

The melt timer (2) sets a predetermined time duration $t_1$ for additional heating the molten solder to the desired constant temperature, so that the motor 144 is actuated to rotate the cam 148 after the lapse of time duration $t_1$, whereby the trowel member carrier plates 142 are pushed outwardly to separate the trowel members 156. Whereupon, the molten solder contained in the solder melting pot 157 formed by the grooves 158 of the opposing trowel members 156 drops onto the workpiece to effect soldering (see FIG. 11D). By opening and closing the trowel members 156 repeatedly, dropping of the molten solder is ensured. The timing of this operation is shown by the timing (k) in FIG. 12.

The controller 67 instructs a solder drop timer to begin counting of time duration during the trowel members 156 are separated to drop the molten solder (timing (j) in FIG. 12). After the lapse of a pre-set time duration $t_2$ counted by the solder drop timer, the trowel members 156 are lowered again to a second lowered position at the timings (j) and (g) in FIG. 12 (see FIG. 11E). The moten solder stuck to the lead wire 162 and forming a semi-spherical mass below the trowel members 156 is pressed by the bottom ends of the trowel members 156. Upon pressing by the bottom ends of the trowel members 156, the molten solder is pushed into the through-hole and allowed to stick to the lead wire 162 more intimately.

The time duration $t_3$ for holding the trowel members 156 at the second lowered position is counted by a heat timer (1). After the lapse of time duration $t_3$, the trowel members 156 are raised and then closed after the lapse of a certain time to be ready for the next operation at the timings (l) and (m) in FIG. 12 (see FIG. 11F). During these operations, the solder guide assembly 80 is held in the upper position and a proper number of solder tips 58A is supplied into the cradle 92 from the solder tip supply assembly 52.

Figure 13:
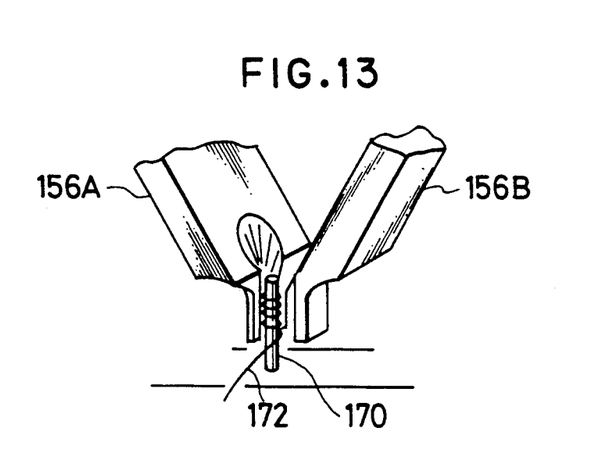
FIG. 13 is an enlarged view showing parts of the trowel members of the second embodiment of the invention.
Figure 14:
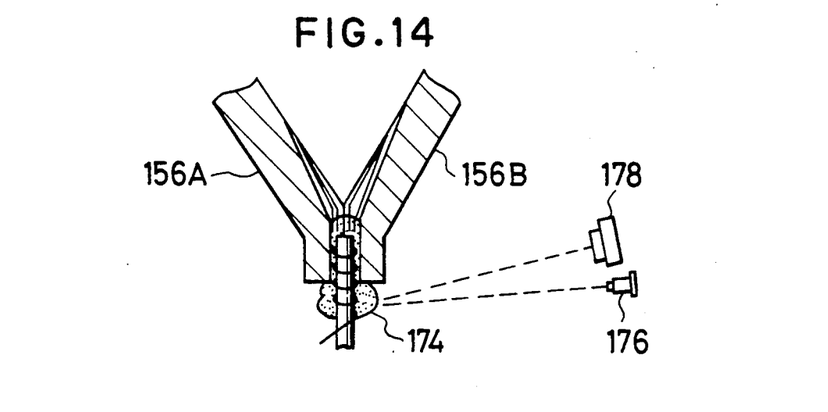
FIG. 14 is an illustration showing the method of controlling the condition of molten solder in the second embodiment of the invention.
Figure 15:
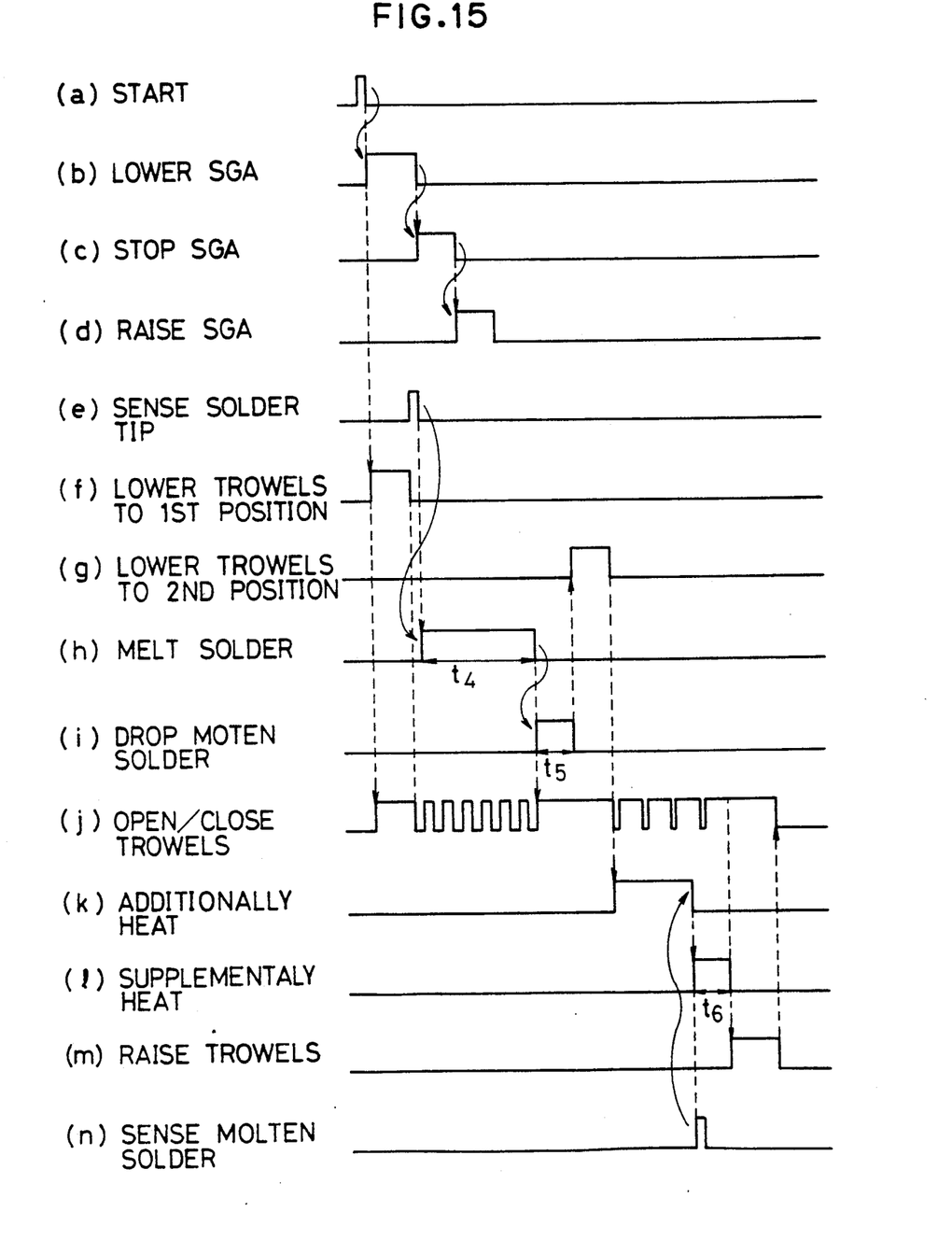
FIG. 15 is a timing chart showing the operation sequence for controlling the condition of molten solder in the second embodiment.

A second embodiment of the invention will now be described with reference to FIGS. 13 to 15. FIG. 13 is an enlarged view of the portions of the trowel members used in this embodiment; FIG. 14 is an illustration showing the method of detecting the condition of molten solder; and FIG. 15 is a timing chart showing the operation sequence. In this embodiment, a wire 172 is wound around a pin 170 protruding from a base plate, and the wire 172 and the pin 170 are soldered together.

The condition of the molten solder is detected while sensing the light beam reflected by a bulged portion 174 of the liquefied solder flown beyond the lower ends of the trowel members 156. In detail, there are provided a light emitting element 176 for emitting a light beam onto the bulged portion 174 and a light receiving element 178 for receiving the light beam reflected by the surface of the bulged portion 174. These elements 176, 178 may be secured to the trowel member carrier plates 142.

When a start signal is fed at the timing (a) in FIG. 15, the solder guide assembly 80 is lowered at the timing (b) in FIG. 15 and the trowel members 156 are lowered to a first lowered position at the timing (f) in FIG. 15 while the trowel members 156 being separated by a small gap. A desired number of solder tips 58A drop into the solder guide assembly 80, and dropping solder tips 58A are sensed by the light receiving element 112B of the solder sensor at the timing (e) in FIG. 15. Whereupon, the melt timer (1) begins to count time for melting the solder tips 58A (timing (h) in FIG. 15).

On the other hand, the solder guide assembly 80 is raised after the lapse of a time duration set by a guide stop timer (timings (c) and (d) in FIG. 15). The trowel members 156 are closed to grasp the upper portion of the pin 170 to heat the same. The trowel members 156 are opened and closed repeatedly to ensure intimate contact between the solder tips 58A and the inner surfaces of the trowel members 156 thereby to ensure uniform melting of the solder tips 58A.

The trowel members 156 are separated after the lapse of time duration $t_4$ set by the melt timer to allow the molten solder to flow down around the pin 170 (timings (h) and (i) in FIG. 15). The time duration $t_5$ (shown by the timing (i) in FIG. 15) for allowing the molten solder to flow down is counted by a solder flow-down timer. The trowel members 156 are further lowered to a second lowered position after the lapse of time duration $t_5$ (as shown by timings (i) and (g) in FIG. 15). The a heat timer (1) begins to count time for heating additionally the molten solder (timing (k) in FIG. 15).

After the heat timer (1) begins to count time, the trowel members 156 are closed and opened repeatedly (timing (j) in FIG. 15). Heating of the solder is accelerated and flow-down of the molten solder is promoted by these opening and closing operations.

Under this condition, the molten solder continues to flow down from the solder melting pot 157 formed by the trowel members 156 to form a bulged portion 174 below the bottom ends of the trowel members 156. When the light receiving element 178 of the melting solder sensor senses the bulged portion 174, a heat timer (2) begins to count time (timings (n) and (1) in FIG. 15). The heat timer (2) sets an additional heating time duration $t_6$ for supplemental heating of molten solder. After the lapse of time duration $t_6$, the trowel members 156 are returned to the upper position and then closed to be ready for the next operation (timings (1) and (m) in FIG. 15).

Figure 16:
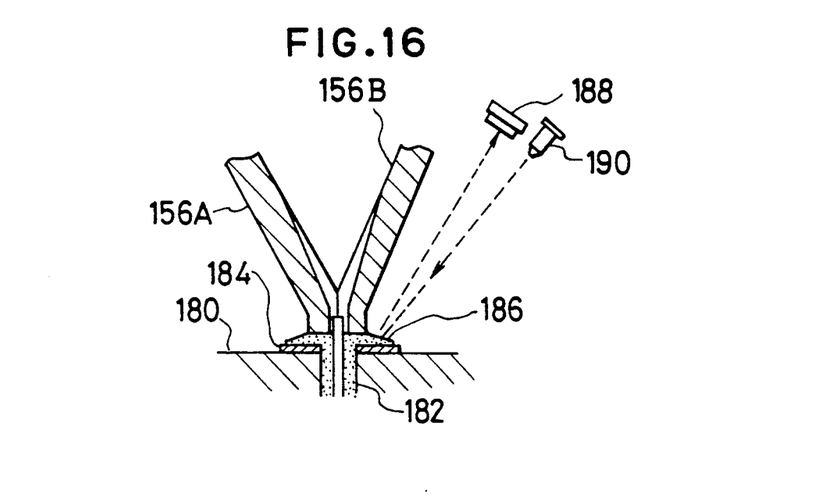
FIG. 16 is an illustration showing a modified method of controlling the condition of molten solder.

FIG. 16 shows an example wherein the method of this embodiment is used for filling solder in a through-hole 182 of a printed circuit board 180. A liquid molten solder sticks on a land 184 around the through-hole 182 to form a bulged portion 186 which reflect a light beam emitted from the light emitting element 190. The light beam reflected by the bulged portion 186 is received by a light receiving element 188.

In the exemplified method shown in FIG. 16, the trowel members 156 may be opened and closed while they are held at the second lowered position repeatedly to press and scrub the molten solder onto the land 184 by the bottom ends of the trowel members 156, whereby flowing of the molten solder is accerelated to improve reliability of the resulted soldering.

The frequency, stroke and timings of the repeated opening and closing operations of the trowel members 156 may be properly determined empirically depending on the size of supplied solder tips 58A and the materials to be soldered.

According to a first aspect of the invention, melting of solder tip is detected by sensing the change in intensity of the light beam reflected by the surface of the molten solder mass which is subjected to additional heating for a predetermined time duration from the time at which complete melting of the solder is detected, whereby the temperature of the molten solder applied on the workpiece is controlled without scattering of the temperature even if the time costed for the solder tips to drop into the solder melting pot is fluctuated. Accordingly, uniform and reliable soldering is realized without the occurrence of false soldering, such as knotty of tubercled soldering, otherwise occurred when the temperature of the molten solder is too low, and without inducing deterioration of solder, otherwise occurred when the temperature of the molten solder is too high.

In detection of melting of the solder, the light beam may be reflected by the surface of portion of the molten solder exposed at the gap between the opposing trowel members, or may be reflected by the surface of the bulged portion of the molten solder flowing from the bottom ends of the trowel members.

According to a further aspect of the invention, the trowel members containing the solder tip may be opened and closed repeatedly to ensure more intimate contact between the solder tip and the inner heating surfaces of the trowel members to eliminate scattering of the condition of the molten solder due to uneven dropping of the solder tip. By opening and closing the trowel members repeatedly during the operation of flowing the molten solder by separating the trowel members, flow-down of the molten solder from the solder melting pot defined by the trowel members is accerelated and flow of the solder applied on the workpiece is improved to ensure more reliable soldering.

What is claimed is:

1. In the soldering method of soldering a workpiece comprising the steps of forming a solder melting pot by engaging plural trowel members, each of said trowel members having a surface made of a solder repellent material at least the portion contacting with the solder, supplying a solder tip having a constant volume to said solder melting pot, melting said solder tip and holding the molten solder temporarily in said solder melting pot and then separating said plural trowel members to allow the molten solder to drop onto said workpiece, an improved method wherein melting of said solder tip is detected by sensing the change in intensity of the light reflected by the surface of said molten solder, and wherein said molten solder is additionally heated for a predetermined time period after the completion of melting of said solder tip.

2. The soldering method according to claim 1, wherein the method comprises the steps of:
   (a) lowering said trowel members to a first lowered position at which the trowel members face close to the surface of said workpiece;
   (b) dropping said solder tip into said solder melting pot formed by said trowel members;
   (c) sensing the intensity of light reflected by the surface of the molten solder to detect melting of said solder tip;
   (d) additionally heating the molten solder during the predetermined time period after the completion of melting of said solder tip is sensed at the step (c); and
   (e) separating said trowel members from each other to allow the molten solder to drop onto said workpiece after the completion of the step (d).

3. The soldering method according to claim 2, wherein said trowel members are closed and opened for plural times during the step (b).

4. The soldering method according to claim 2, wherein said trowel members are closed and opened for plural times during the step (e).

5. The soldering method according to claim 2, further comprising the step (f) of lowering said trowel members to a second lowered position while holding said trowel members separated from each other and then supplementally heating the molten solder stuck to the workpiece for a pre-set time period.

6. The soldering method according to claim 1, wherein the method comprises the steps of:
   (a) lowering said trowel members to a first lowered position at which the trowel members face close to the surface of said workpiece;
   (b) dropping said solder tip into said solder melting pot formed by said trowel members;
   (c) slightly separating said trowel members after the lapse of a predetermined time period from the time of detection of dropping of said solder tip to allow molten solder to flow down along the interior surfaces of said trowel members so as to form a bulged portion of molten solder at the vicinity of the lower ends of said trowel members;
   (d) sensing the intensity of light reflected by the surface of said bulged portion of said molten solder to detect melting of said solder tip;
   (e) heating the molten solder for said additional time period after the completion of melting of said solder tip and then returning said trowel members back to the raised position.

7. The soldering method according to claim 6, wherein said trowel members are closed and opened for plural times during the step (b).

8. The soldering method according to claim 6, wherein said trowel members are lowered to a second lowered position at the step (c) while holding said trowel members in the separated position.

9. The soldering method according to claim 6, wherein said trowel members are closed and opened for plural times during the step (c).

10. The soldering method according to claim 8, wherein said trowel members are closed and opened for plural times during the step (c).

11. A soldering apparatus comprising:
    plural trowel members each having a surface made of a solder repellent material at least the portion contacting with the solder, said plural trowel members being engaged together to form a solder melting pot and separated from each other to allow the molten solder to drop onto a workpiece, said solder tip being melted in said solder melting pot and then allowed to drop when said plural trowel members are separated from each other;

a light emitting element for emitting light toward the surface of the molten solder held in said solder melting pot;

a light receiving element for receiving the light reflected by the surface of molten solder; and a controller for detecting the change in intensity of reflected light to subject the molten solder to additional heating for a predetermined time period from the time at which the change in intensity of reflected light is detected.

12. The soldering apparatus according to claim 11, further comprising;

a solder tip supply assembly for supplying a solder tip having a constant volume to said solder melting pot;

a cradle disposed above said solder melting pot for receiving said solder tip supplied from said solder tip supply assembly to hold said solder tip temporarily in the stationary condition, said cradle being capable of being inverted to allow said solder tip to fall into said solder melting pot;

a solder tip guide means for guiding said solder tip dropping from said cradle to said solder melting pot; and a reflector mirror disposed on the bottom face of said cradle for reflecting light so that the light reflected by the surface of the molten solder transmits through the space in said solder tip guide means to said reflector mirror by which the light is reflected and the reflected light if received by said light receiving element.

13. The soldering apparatus according to claim 11, wherein said light emitting element emits light toward the lower portions of said trowel members, and said light receiving element receives the light reflected by the surface of the bulged portion of molten solder at the vicinity of the lower portions of said trowel members.

14. The soldering apparatus according to claim 11, further comprising:

a solder tip supply assembly for supplying a solder tip having a constant volume to said solder melting pot;

a cradle disposed above said solder melting pot for receiving said solder tip supplied from said solder tip supply assembly to hold said solder tip temporarily in the stationary condition, said cradle being capable of being inverted to allow said solder tip to fall into said solder melting pot;

a solder tip guide means for guiding said solder tip dropping from said cradle to said solder melting pot; and a sensor for sensing said solder tip dropping through said solder tip guide means, and wherein the timing for separating said trowel members is determined from the time of sensing the dropping solder tip.

* * * * *